Feb. 25, 1958

L. S. SHAPIRO 2,824,393

CHART HOLDER FOR AIRCRAFT

Filed April 13, 1954

LAWRENCE S. SHAPIRO
INVENTOR.

BY *Jesse P. Wham*

Attorney

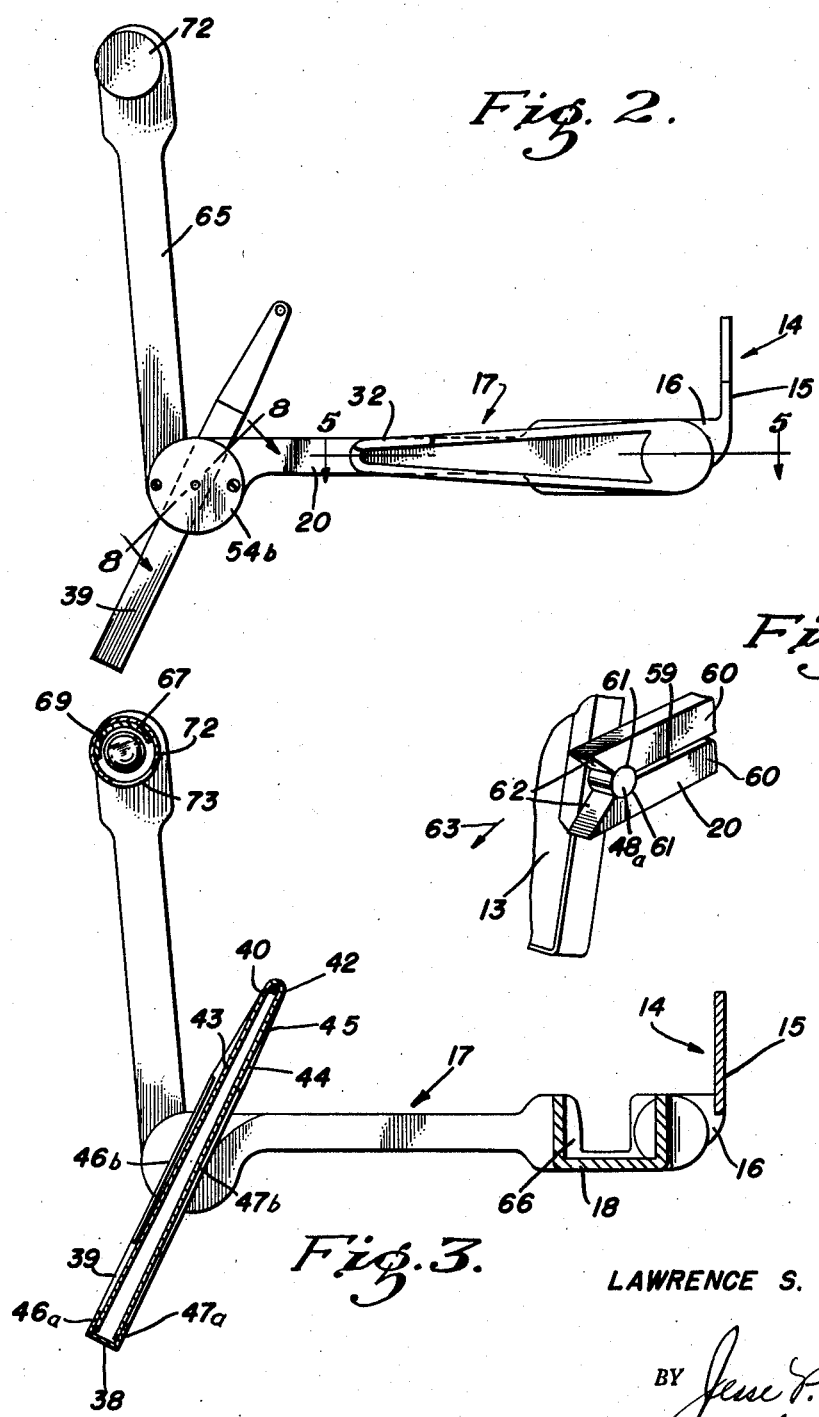

Feb. 25, 1958
L. S. SHAPIRO
2,824,393
CHART HOLDER FOR AIRCRAFT
Filed April 13, 1954
3 Sheets-Sheet 3
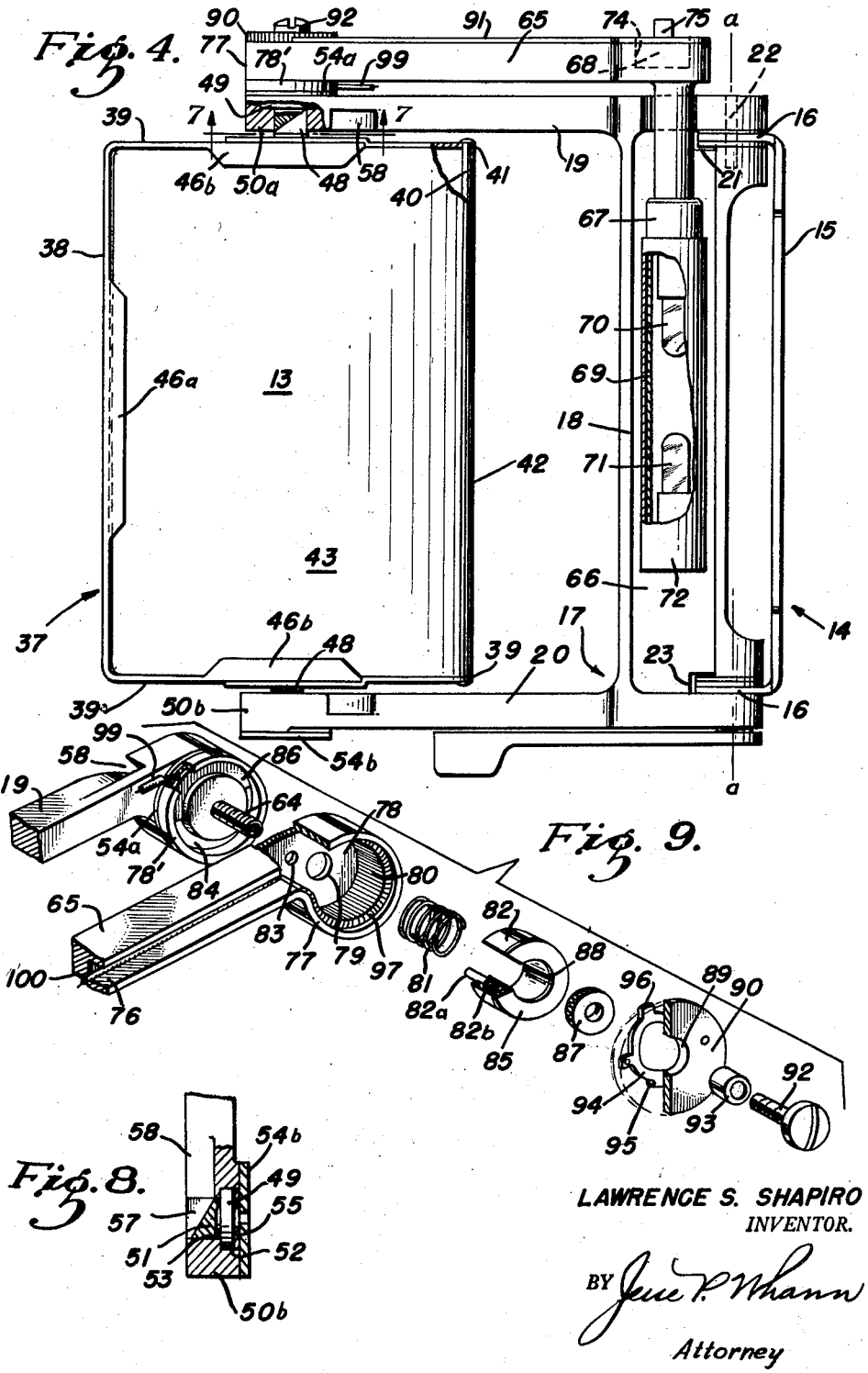
LAWRENCE S. SHAPIRO
INVENTOR.
BY *Jene P. Whann*
Attorney United States Patent Office 2,824,393
Patented Feb. 25, 1958

2,824,393

CHART HOLDER FOR AIRCRAFT

Lawrence S. Shapiro, Los Angeles, Calif., assignor to Clowd, Inc., Arcadia, Calif., a corporation of California Application April 13, 1954, Serial No. 422,734

8 Claims. (Cl. 40—10)

My invention relates to equipment to be used in aircraft to assist in standardization of management procedures contributing to efficient flight planning, performance in accordance with the flight plan and monitoring of the flight. In particular the invention is a device referred to as a chart holder, it being intended, however, that this term shall be used in its broadest sense to include not only maps but other sheets having thereon flight plans and other information necessary to the carrying out of the previously made plan for the flight of the aircraft from one place to another.

It is an object of the invention to provide a chart holding device having a table element or chart holder proper and means to support the same in the aircraft ahead of the pilot at an elevation very close to eye level, so that the information-imparting sheets carried by the chart holder may be readily and continuously observed without the necessity for the pilot moving his line of vision to any material extent from its customary projection out through the front windows of the aircraft cockpit.

A further object of the invention is to provide in this device means for adjustably supporting the chart-receiving table element so that it may be readily moved into a retracted position wherein it will not be in a vision obstructing position during actual landing operation.

A further object of the invention is to provide a chart holding device having a table member for receiving sheets having thereon information necessary to the carrying out of the flight plan, this table member being supported so that it may be rotated through an angle of substantially 180° so as to bring into view information-carrying sheets which are secured to the opposite faces of the table member.

A further object of the invention is to provide in this chart holding device an adjustable supporting member having parallel arms and a chart-receiving table supported between these arms, and it is a further object of the invention to mount the support on a bracket which is connected to the cockpit structure and so that the support will be adjustable around a substantially horizontal hinge axis, there being means for locking the support in any adjusted position thereof.

A further object of the invention is to provide in the chart holding device a locking means which releases as the support is swung from a forwardly projecting position to a retracted position, and it is a further object of the invention to provide this lock with means for tightening it in response to downward force applied to the bifurcated supporting member, thereby preventing the support and the table from being moved downwardly from an adjusted position by the downward force of inertia acting in the swingable support and the table when downward movement of the aircraft is abruptly stopped at the end of a down-draft drop.

Further objects and advantages of the invention are to provide a simple means for supporting a lamp in a position to illuminate sheets carried by the table of the device, this lamp and its holder being readily retractible into a recess provided in the structure of the device; to provide a simple means for controlling the intensity of the illumination; to provide a novel construction for the chart-receiving table whereby effective means are provided around the edge of the table to clamp a sheet or sheets in place on the table; and to provide a simple means for detachably and pivotally connecting the table to the support, making it possible to remove the table from the support so that the sheets recording or showing the flight plan and/or navigational data may be assembled thereon at some other place, for example, in the pilot's office, and then secured in operative position in the table support of the device.

Further objects and advantages of the invention may be brought out in the following part of the specification wherein relatively small details of construction have been described for the purpose of disclosure, without the intention, however, of limiting the scope of the invention set forth in the appended claims.

Referring to the accompanying drawings which are for illustrative purposes only:

Fig. 2 is a side view of the chart holding device, to enlarged scale taken from the position indicated by the arrow 2 of Fig. 1;

Fig. 3 is a sectional view taken as indicated by the line 3—3 of Fig. 1;

Fig. 4 is a plan view, to enlarged scale of the chart holding device, with the lamp holder retracted into its recess and with the chart receiving table lying substantially flat in the plane of the arms which support the table;

Fig. 8 is a fragmentary sectional view taken as indicated by the line 8—8 of Fig. 2;

Fig. 9 is a perspective, exploded view showing switch and rheostat parts contained within the chambered end of the lamp supporting arm; and Fig. 10 is a fragmentary perspective view showing another means for detachably connecting the chart-receiving plate to the supporting member of the device.

Figure 1:
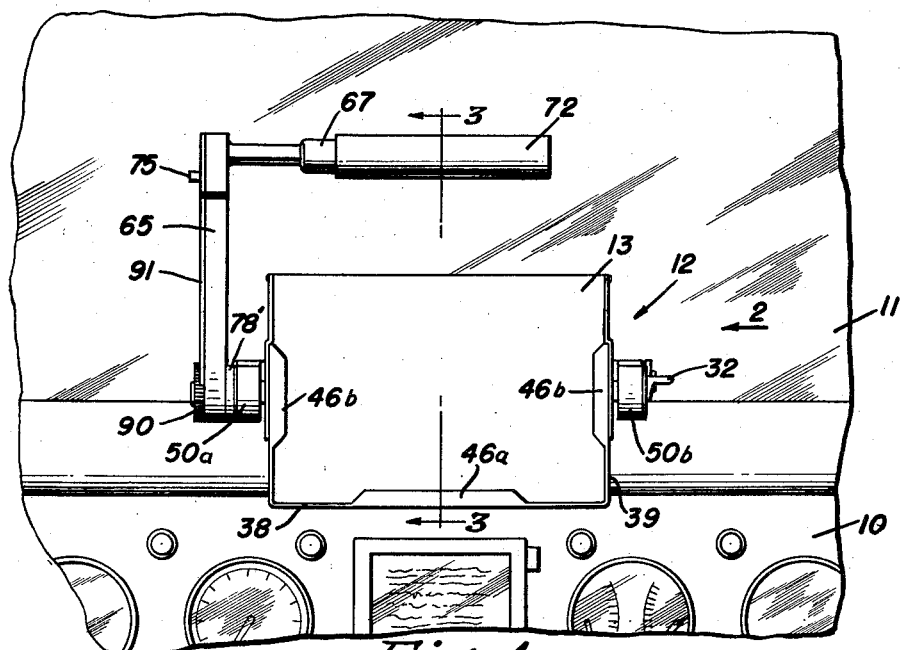
Fig. 1 is a face view of the invention located above the instrument board in the cockpit of an aircraft.
Figure 5:
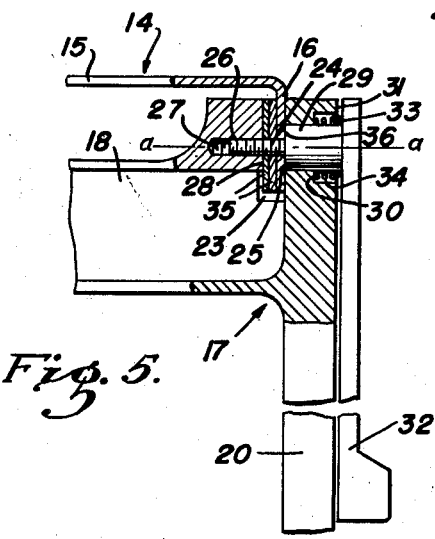
Fig. 5 is a fragmentary sectional view taken as indicated by the line 5—5 of Fig. 2.

In Fig. 1, I show a portion of the instrument panel 10 of an airplane cockpit with a portion of the front window 11 thereabove. My chart holding device 12 is adapted to be positioned at or adjacent the upper edge of the instrument panel 10 where it will be near to the line of vision of the pilot and/or of the co-pilot when such line of vision extends forwardly through the window 11 as is preferable during the aircraft flight. The chart-holding device 12 has a plate or table 13 of generally rectangular form adapted to receive thereon sheets or cards or maps, or the like, providing information which is readily perceived by the pilot as the flight progresses, thereby relieving the pilot of the necessity of trying to remember details of a planned flight. The chart holding device 12 carries thereon detailed information which is readily available to the pilot as the flight progresses, permitting him to carry on his duties in a more relaxed and efficient state of mind than where he is under the strain of trying to remember details or of checking up on such details from a book or sheet of paper carried in his lap, which makes it necessary to divert his vision from the area ahead of the aircraft. As shown in Figs. 2 to 5, the chart holding device comprises a bracket 14 having a plate portion 15 adapted to be secured to a supporting member or wall in the aircraft, and spaced tongues or ears 16 which project forwardly in vertical planes from the ends of the plates 14. A bifurcated support 17 is hingedly connected to the tongues 16 of the bracket 14 so that it may be swung upwardly or downwardly around the hinge axis *a—a.* The supporting member 17 includes a transverse bar 18 with arms 19 and 20 extending from the ends thereof in parallel relation. At one end of the arm 18 there is a slot 21 to receive one of the tongues 16 of the bracket 14, and a pin 22, supported by the bar 18, extends through the tongue 16 to provide a hinge connection. At the opposite end of the bar 18 there is a slot 23 to receive the remaining tongue 16, and as shown in Fig. 5, a clamping screw 24 extends through an opening 25 in the tongue 16, this screw 24 lying on the axis *a—a*. The screw 24 has a threaded portion 26 which enters a correspondingly threaded opening 27 in the wall portion 28 of the bar 18 defining one side of the slot 23. The screw 24 has an axially elongated head portion 29 which extends through a counterbored opening in the wall portion 31 of the bar 18 on the opposite side of the slot 23 from the wall portion 28. An operating handle 32 is fixed on the outer end of the head 29 and a compression spring 33 is disposed in the counterbored portion 34 of the opening 25 to constantly apply a friction which will prevent free rotation of the handle relative to the supporting member 17. Friction washers 35 are disposed between the wall portion 28 and the adjacent tongue 16, and the screw head 29 has a radial shoulder 36 which bears directly against the rightward face of the tongue 16. The threads of the threaded portion 26 of the screw 24 are righthand so that clockwise rotation of the handle 32 will result in leftward movement of the head 29 so as to clamp the parts 28, 35 and 16 tightly together and thereby provide a locking action which will resist rotation of the supporting member 17 around the axis *a—a.*

Figure 6:
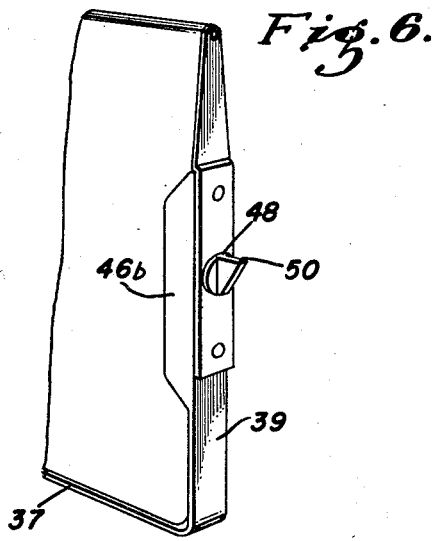
Fig. 6 is a fragmentary perspective view of one edge of the table, showing a connecting member or trunnion projecting therefrom.

The table 13 is detachably connected to the ends of the arms 19 and 20. This table, as best shown in Figs. 3 and 4, has a frame 37 defining a rectangle. The frame 37 has a longitudinal portion 38 and side portions 39 extending perpendicularly from the ends of the portion 38. A slender bar 40 is extended between the extremities 41 of the side portions 39 and lies within the U-shaped bend 42 between plate portions 43 and 44 of a metal plate 45 which has been bent on a transverse line intermediate the ends thereof to bring the plate portions 43 and 44 into nearly parallel relation. Flanges or lifts 46 and 47 respectively indicated by the numerals 46a, 46b, 47a and 47b extend inwardly from the edges of the frame portions 38 and 39. The plate portions 43 lie within the frame 37 and spring tension acting in the metal of the bend 42 and of the plates 43 and 44 urges the plates 43 and 44 respectively outwardly into engagement with the inner surfaces of the flanges or clips 46 and 47. The plates 43 and 44 provide upper and lower surfaces for the table 13, and the designation of these plates 43 and 44 as upper and lower depends upon the position in which the table 13 has been rotated. With the table 13 positioned as shown in Fig. 4 the plate 43 may be designated as the upper plate of the table, but if the table 13 is rotated through an angle of substantially 180°, the plate 44 will be disposed uppermost. The side portions 39 of the frame 37 have aligned trunnion members 48 projecting therefrom, Fig. 6, arranged to engage rotatable bodies 49 carried in axial alignment in the cylindrical enlargements 50a and 50b formed on the ends of the arms 19 and 20 of the supporting member 17. As shown in Figs. 4 and 8, the rotatable bodies 49 each comprise a cylindrical portion 51 having a flange 52 formed thereon. Each rotatable body 49 is received by a counterbored opening 53 in one of the end portions 50a or 50b of an arm 19 or 20. The rotatable bodies 49 are respectively held in place by cover plates 54a and 54b, there being spring washers 55 between the cover plates and the heads 52 of the rotatable bodies 49 so that the rotatable bodies 49 will be frictionally held against free rotation in the openings 53.

Figure 7:
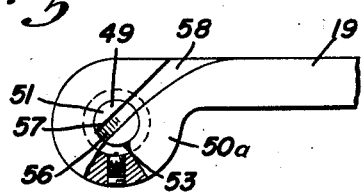
Fig. 7 is a fragmentary sectional view taken as indicated by the line 7—7 of Fig. 4.

Each trunnion member 48 has a projecting tongue 56 in the form of a triangular prism having parallel side faces, and the cylindrical portions 51 of the rotatable bodies 49 have slots or recesses 57 formed diametrically therein and corresponding in shape to the tongues 56 of the trunnion members 48. Diagonally disposed entrance passages or slots 58 are formed in the arms 19 and 20 leading to the recesses 57 of the rotatable bodies 49 as shown in Figs. 4, 7, 8 and 9, through which the tongues 56 of the trunnion members 48 may be moved into or away from the recesses 57, thereby making it possible to quickly install or move a table member 13 from its operative position between the arms 19 and 20. In Fig. 7, a tongue 56 is shown in a recess 57 of a rotatable body 49, in alignment with an entrance slot 58. It is only at this time that the tongue 58 may be moved upwardly and diagonally from the recess 57 into and through the entrance slot 58. If the table 13 is rotated slightly so as to rotate the tongues 56 and the rotatable bodies 51 so that the recesses 58 and the tongues 56 are disaligned from the entrance slots 58, the walls of the opening 53 will prevent removal of the tongues 56 from the recesses 57 and accordingly will prevent removal of the table 13 from its operative position between the arms 19 and 20.

In the perspective view, Fig. 10, I show an alternative form of detachable pivotal connection between the table 13 and the arms 19 and 20. Herein, cylindrical trunnions 48a project from opposite sides of the table 13. Each of the arms 19 and 20 is provided with a longitudinal slot 59 leading in from the front end thereof, thereby providing upper and lower string fingers 60 having opposed partly cylindrical depressions 61, approached by angled faces 62, to receive diametrally opposite portions of the trunnion 48a, to rotatably support this trunnion 48a and the table 13 from which the trunnions extend. An outward pull on the table 13, in the direction of the arrow 63 of Fig. 10 will result in the fingers 60 springing apart sufficiently to permit withdrawal of the trunnions 48a from the depression 61 in which they are seated. A reversal of this action is employed to replace the table 13 in its operative position between the forward ends of the arms 19 and 20.

Referring to Fig. 9, the plate 54a has a pin 64 projecting therefrom. On this pin 64, a lamp supporting arm 65 is rotatably mounted so that it may be swung between a retracted position as shown in Fig. 4, parallel to the arm 19, to a raised position as shown in Figs. 1, 2 and 3. As shown in Figs. 3 and 4, the bar 18 of the support 17 has an upwardly faced recess 66 to receive a lamp housing 67, of tubular form, which extends from the end 68 of the arm 65. When the lamp housing 67 is in retracted position as shown in Fig. 4, it will lie in the recess 66 and the arm 65 will be parallel to the arm 19. As shown in Figs. 3 and 4, the lamp housing 67 has a windowed shell 69 arranged to hold lamps 70 and 71 in axial relation. On the shell 69 a tubular cover 72 is mounted, this cover having therein a slot or window 73 through which light from either of the lamps 70 and 71 may shine onto the table 13 or sheets which are held on this table. The cover 72 may be rotated axially so as to adjust the position of the window 73 with relation to the lamps 70 and 71. It is contemplated that the lamps 70 and 71 shall be of two different colors, for example, white and red, and switch means 74 is provided in the arm 65, operable by a button 75 for selectively connecting these lamps into an electric circuit.

As shown in Fig. 9, the arm 65 has a channel 76 leading to a hollow cylinder 77 which is open at its outer end and has at its inner end a wall 78 arranged to lie against the front face of a disc 78' of insulating material surrounding the pin 64 adjacent the plate 54a, there being an opening 79 in the center of the wall 78 through which the pin 64 projects. A cylindrical resistance winding 80 is fixed in the cylinder 77', and in the order shown, the following parts are arranged upon the pin 64. A spring 81 is disposed against the inner surface of the wall 78. The spring 81 is surrounded by a cylindrical insulator body 82 fixed within the resistance winding 80 and having a spring-pressed contact pin 82a which extends through an opening 83 in the wall 78 to engage either the bottom wall 84 of an annular recess in the disc 78' on an arcuate contact plate 86 disposed in the upper portion of the annular recess in the disc 78', when the arm 65 is rotated around the pin 64. A circular contact plate 85 is secured to the front face of the body 82, this plate 85 being connected through a spring 82b with the contact pin 82a which in turn connects the plate 85 to the contact plate 86 when the arm 65 is rotated upwardly from the position in which it is shown in Figs. 4 and 9 to carry the pin 82a up onto the front end of the contact plate 86. A nut 87 is threaded upon the pin 64 and is arranged to compress the spring 85 to vary the frictional engagement between the disc 78' and the wall 78. The insulator body 82 has an opening 88 to receive the spring 81 and the nut 87. A screw 92, which threads into the end of the pin 64, clamps against the end of the screw 64 a bushing 93 adapted to extend through an opening 89 in a disc or adjusting wheel 90 (see Figs. 1 and 4) arranged to confront and close the open end of the cylinder 77. The channel 76 is closed by a separate strip 91 of insulating material. The wheel 90 carries on the inner face thereof a circular spring contact member 94 having a contact part 95 which rests against the radial surface of the contact plate 85, and a contact part 96 positioned so that it will bear against the circular end 97 of the resistance winding 80.

The arm 65, which is made of metal, is grounded and a live connection 99 extends into the periphery of the disc 78' and is connected to the contact plate 86. A conductor 100 is connected to the resistance winding 80 and extends through the channel 76 of the arm 65 to the switch 74 which has the function of connecting the circuit selectively to the lamps 70 and 71. When the arm 65 is raised from its retracted position, the contact 82a will move in clockwise direction as viewed in Fig. 9 into engagement with the contact plate 86. This will close the lamp circuit and the electrical current will flow from the contact plate 86 to the contact part 95 and then through the contact parts 82a, 82b, 85, 95, 94 and 96 to the resistance winding 80. By rotating the disk or wheel 90, the contact part 96 may be caused to slide along the curved edge or end 97 of the winding 80, thereby varying the resistance placed in the lamp circuit by the winding 80, to adjust the brightness of whichever lamp 70 or 71 may be brought into the lamp circuit by the actuation of the switch 74.

In the use of the chart holding device, papers or cards, either singly or in stacks are secured on the plates 43 and 44 of the table 13 by the simple expedient of depressing an edge portion of a plate 43 or 44 and slipping the paper or papers under a flange or clip 46 or 47. Papers or cards of different size and shape may be readily secured on the table, both on the top and on the bottom thereof, and the table may be rotated on the axis of the rotatable bodies 49 as required. Also, it is possible to wrap or extend around the bend 42, from one to the other of the plates 43 and 44, a sheet which is such length to require this procedure.

Referring to Fig. 1, the supporting of the table 13 and the arm 65 is such that with a single operation of one hand the pilot may swing the lamp housing 67 rearwardly and downwardly into the recess 66 and also rotate the upper edge of the table 13, Fig. 1, rearwardly and downwardly so that the table 13 will assume a flat position between the arms 19 and 20, as shown in Fig. 4. In these retracted positions, the lamp housing 67 and the table 13 will not obstruct the vision of the pilot through the lower portion of the window 11.

As shown in Fig. 5, actuation of the locking means for the supporting member 17 is accomplished by clockwise rotation of the lever 32 and the screw 24. The greater frictional effect between the shoulder 36 and the screw 24 and the rightward face of the tongue 16 tends to hold the screw 24 stationary when the supporting member 17 is rotated around the axis a—a. Accordingly, if the projecting portion of the supporting member 17 is swung downwardly, the threads defining the opening 27 will rotate on the threaded portion 26 of the screw, in a direction to pull the screw 24 leftwardly, thereby tightening the locking effect exerted by the screw 24 on the parts 25, 28 and 35. Also, if the projecting portion of the supporting member 17 is raised, the screw threads defining the opening 27 will rotate lefthand with relation to the threaded portion 26 of the screw 24, thereby moving the wall 28 of the bar 18 leftwardly away from the plate 16 so that the locking means will be relaxed and the supporting member 17 may be swung upwardly relatively freely. The advantage of this arrangement is that the supporting member 17 may be readily swung upwardly out of the way, and if, during flight, the aircraft should drop in an air pocket and then come to a relatively sudden stop at the end of this drop, a small downward movement of the supporting member 17 as the result of inertia will cause a tightening of the locking means, thereby limiting the extent to which the supporting member 17 may swing downwardly under such circumstances.

I claim:

1. In a chart holder for aircraft: a bracket adapted to be secured to a supporting member in the aircraft; a support connected to said bracket, said support having a pair of spaced arms; a chart receiving table arranged to be placed between said arms; means for detachably and swingably connecting said table to said arms; and means acting in response to rotation of said table relative to said arms to prevent detachment of said table from said arms.

2. In a chart holder for aircraft: a bracket adapted to be secured to a supporting member in the aircraft; a support connected to said bracket so as to swing up and down around a nonvertical axis, said support having a pair of spaced rigidly interconnected arms; a chart receiving table arranged to be placed between said arms; means for detachably and swingably connecting said table to said arms; and means for locking said support in a selected position of rotation around said axis.

3. In a chart holder for aircraft: a bracket adapted to be secured to a supporting member in the aircraft; a support connected to said bracket so as to swing up and down around a nonvertical axis, said support having a pair of spaced rigidly interconnected arms; a chart receiving table arranged to be placed between said arms; means for detachably and swingably connecting said table to said arms; and means for locking said support in a selected position of rotation around said axis, said locking means being characterized by having means arranged in cooperative relation so as to release the locking means when said support is swung upwardly.

4. In a chart holder for aircraft: a bracket adapted to be secured to a supporting member in the aircraft; a support connected to said bracket so as to swing up and down around a nonvertical axis, said support having a pair of spaced rigidly interconnected arms; a chart receiving table arranged to be placed between said arms; means for detachably and swingably connecting said table to said arms; and means for locking said support in a selected position of rotation around said axis, said locking means being characterized by having means arranged in cooperative relation so as to release the locking means when said support is swung upwardly, and to tighten when said support is swung downwardly from a position in which it locked.

5. In a chart holder for aircraft: a bracket adapted to be secured to a supporting member in the aircraft; a support connected to said bracket so as to swing up and down around a nonvertical axis, said support having a pair of spaced rigidly interconnected arms; a chart receiving table arranged to be placed between said arms; means for detachably and swingably connecting said table to said arms; and means for locking said support in a selected position of rotation around said axis, said locking means being characterized by having means arranged in cooperative relation so as to tighten the locking means when said support is swung downwardly from any position in which it has been locked.

6. In a chart holder for aircraft: a bracket adapted to be secured to a supporting member in the aircraft; a support connected to said bracket, said support having a pair of spaced arms; a chart receiving table arranged to be placed between said arms; trunnions projecting from the opposite portions of said table; socket means carried by said spaced arms of said support to detachably receive said trunnions, whereby said table may be revolved around the axis defined by said trunnions; and means acting in response to rotation of said table to prevent disengagement of said trunnions from said socket means.

7. In a chart holder for aircraft: a bracket adapted to be secured to a supporting member in the aircraft; a support connected to said bracket, said support having a pair of spaced arms; a chart receiving table arranged to be placed between said arms; members projecting from opposite portions of said table; and rotatable bodies carried by said arms of said support, said bodies having recesses to receive said members when said bodies are in receiving positions, and there being means for holding said members in said recesses when said bodies are rotated from said receiving positions thereof.

8. A device as defined in claim 7 wherein said arms of said support have walls arranged to guide said members into said recesses of said bodies.

References Cited in the file of this patent

UNITED STATES PATENTS

| | | |
|---|---|---|
| 1,528,312 | Taylor | Mar. 3, 1925 |
| 1,773,337 | Barlow | Aug. 19, 1930 |
| 2,288,732 | Nickerson | July 7, 1942 |
| 2,416,976 | Barbieri | Mar. 4, 1947 |
| 2,691,837 | Gove | Oct. 19, 1954 |

FOREIGN PATENTS

| | | |
|---|---|---|
| 464,480 | Great Britain | Apr. 19, 1937 |